United States Patent [19] [11] Patent Number: 5,784,443
Chapman et al. [45] Date of Patent: Jul. 21, 1998

[54] INTEGRATED REVENUE DOMAIN FOR TELECOMMUNICATION NETWORKS

[75] Inventors: Jeffrey M. Chapman, Cascade, Colo.; John Reynolds, Medway, Mass.; Steve Brandenburg, Marion, Iowa; Samuel Howlette, Great Falls, Va.

[73] Assignee: MCI Corporation, Washington, D.C.

[21] Appl. No.: 650,151

[22] Filed: Feb. 1, 1996

[51] Int. Cl.⁶ .......................... H04M 15/00; H04M 15/06
[52] U.S. Cl. .......................... 379/119; 379/116; 379/120; 379/121; 379/112
[58] Field of Search .......................... 379/111, 112, 379/114, 115, 116, 119, 120, 121, 201, 208, 229, 230

[56] References Cited

U.S. PATENT DOCUMENTS

| | | | |
|---|---|---|---|
| 4,611,096 | 9/1986 | Asmuth et al. | 379/112 |
| 5,218,632 | 6/1993 | Cool | 379/119 |
| 5,345,501 | 9/1994 | Shelton | |
| 5,351,285 | 9/1994 | Katz | |
| 5,351,286 | 9/1994 | Nici | |
| 5,355,403 | 10/1994 | Richardson et al. | |
| 5,369,680 | 11/1994 | Borbas et al. | |
| 5,381,461 | 1/1995 | Baals et al. | |
| 5,537,611 | 7/1996 | Rajagopal et al. | 379/115 |
| 5,633,919 | 5/1997 | Hogan et al. | 379/115 |

Primary Examiner—Curtis Kuntz
Assistant Examiner—Paul Loomis

[57] ABSTRACT

A system and method automatically, in real-time, create and maintain records of customer use of a telecommunication network for diverse types of service and costs. Each customer use of the network is collected and tagged in a record as an event for each switching device in the network. Real-time event correlation based upon all tags is performed and combined into a standard record for each event. Additional information, e.g. pricing, tax, service is incorporated into the standard record as a basis for billing the customer for use of the diverse types of services and costs on the network.

10 Claims, 3 Drawing Sheets

INTEGRATED REVENUE DOMAIN FOR TELECOMMUNICATION NETWORKS

BACKGROUND OF THE INVENTION

1. Field of the Invention

The present invention relates to telecommunications networks. More particularly, the invention relates to systems and methods for creating and maintaining records of customers' use of the resources of a communications network including compiling such records in a fast and versatile manner to provide billing and statistical information.

2. Description of the Prior Art

Users of current telephone and data communication networks often demand the use of a wide variety of network facilities that may be provided by more than one vendor. Each vendor is faced with the need to monitor network traffic, and to provide accurate billing consistent with the usage of the network. Flat-rate billing is inadequate since usage varies widely, yet in order to bill a client based upon usage of network facilities, user and call information must be tracked over the entire path of the call.

Limited exchange of user and call information between sites along a communications path is known. For example, U.S. Pat. No. 5,351,286 (Nici) teaches the use of two networks for communication, where, if a first user on an ISDN network wishes to connect to another user on a voice-band network, identity and account information is derived from the call set-up commands of the first user and passed to the provider of the voice-band network.

Even in such an environment, billing for services is problematic, as each facility must track users and generate usage summaries independently. This results either in high overhead (billing is compiled at each site and sent to user separately) or a significant delay as information is forwarded to a central billing site). Therefore, it would be useful to have a system for telecommunications networks that would automatically, and in real time, report information relating to all resources used by a network user during a call.

SUMMARY OF THE INVENTION

An object of the invention is a system and method for providing diverse types of pricing and billing information for customer use of telephone services offered by a telecommunications network.

Another object is a system and method to manage different types of telephone service products in a single stream process for a telephone company.

Another object is a system and method for handling customers on a specialized basis starting at a call record through to the billing process in a telecommunications network.

These and other objects, features and advantages are accomplished in a telecommunications network which provides means to compile and correlate all usage records created by a specific call as it is transmitted through a communications network. The compilation and correlation of usage records is achieved by assigning a unique identifier to each call within a communications network and propagating the identification to all network resources used within the call. Compilation and correlation of records is accomplished within a short time after the termination of the event. The compiled resource-usage records are translated into a record that may be centrally archived and that accurately reflects customers' use of network resources. This record may then be accessed by further systems, such as billing and network traffic control.

An advantage of the invention is that it provides a translation process that may be easily modified, updated, or customized based upon specific customer profiles as well as programs or offerings of the network service provider.

DETAILED DESCRIPTION OF A PREFERRED EMBODIMENT OF THE INVENTION

Figures 1, 2:
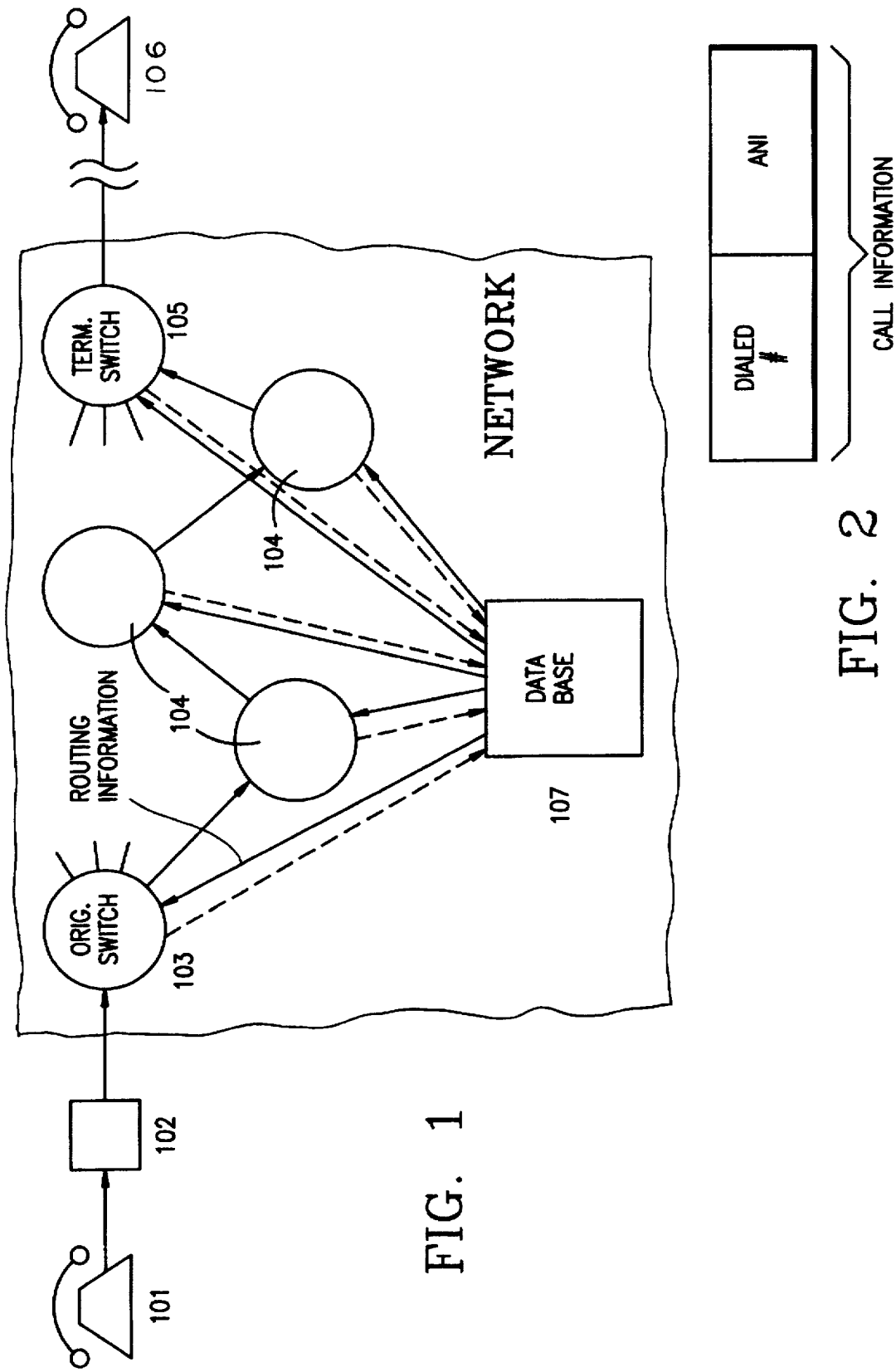
FIG. 1 is a block diagram of a prior art telecommunications network.
FIG. 2 is a representation of telephone call information transmitted in the network of FIG. 1.

In FIG. 1, an originating user 101 dials a call through local exchange (LEC) 102 which, in turn, routes the call to an originating switch 103 within the communications network. LEC 102 typically also forwards a minimum of call information to the switch 103. The call information, as shown in FIG. 2, consists of a dialed number and the ANI (automatic number identification) of the calling telephone. The call is then routed from originating switch 103, through a variable number of intermediate switchpoints 104, to a terminating switch 105, and further to the called site 106. To accomplish the routing, originating switch 103 sends the call information to a central data base site 107 over an internal network connection. The central site then sends back routing instructions to switch 103, as well as all switches 104,105 that are required to route the call. It does not, however, provide call information to switchpoints beyond the originating switch, and any reports of network usage must rely on records of call information and routing instructions maintained at the data base site. This architecture incurs a significant load on the facilities at the central site, especially if it is desired to create usage reports in real time.

Figure 3:
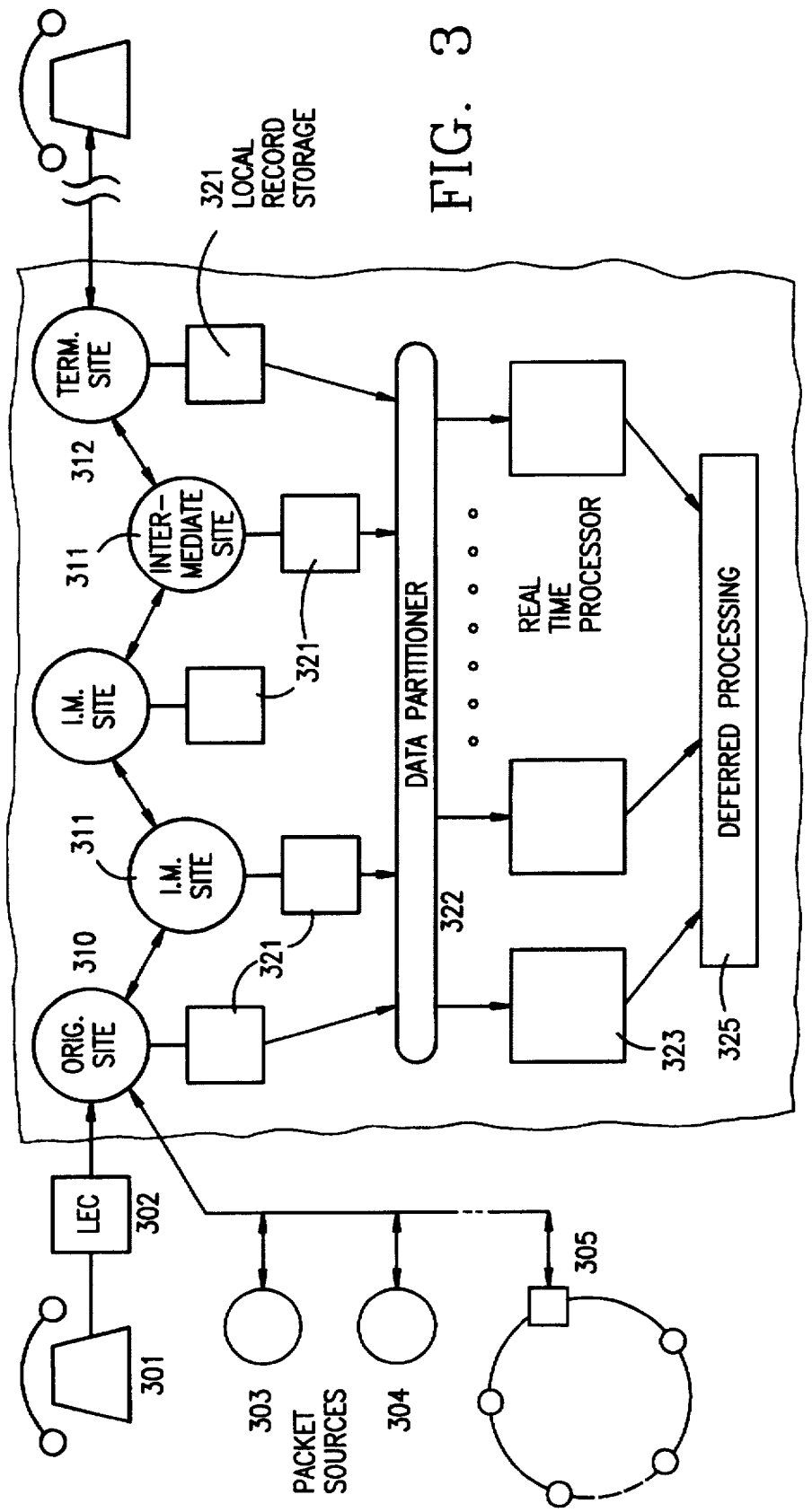
FIG. 3 is a block diagram of a telecommunications network incorporating the principles of the present invention.

An embodiment of the invention is shown in the communications network of FIG. 3. Similarly to the procedure as described above, an originating user may dial a call through LEC 302 to a network site-of-origin 310 for a network. The LEC passes at least a minimum of call information to the network (dialed number and ANI).

Figure 4:
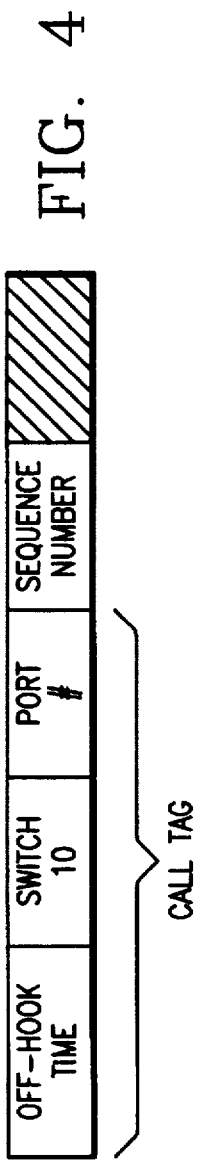
FIG. 4 is a representation of telephone call information transmitted in the telecommunications network of FIG. 3.

As soon as a call is received by the network, it is labeled as a network event. It is assigned a unique call tag, which call tag is transmitted along the routing path of the event, from site-of-origin 310, through all intermediate switches 311 to the destination switch 312. Switches 310 and 312 need not be structurally different from intermediate switches 311, and are labeled separately for convenience. At each site, a record is created of the event and placed in a local record store 321, along with the associated call tag. A suitable format for the call tag is shown as part of a local record in FIG. 4 of the drawings. The call tag includes an off-hook time for the call; the terminating switch ID; the port number at the switch, and the sequence or customer number of the call.

The large number of records made available by network switches 310–312 are processed in a series of stages. The load of processing raw resource records is distributed among a number of real-time processors 323 by a data partitioner stage 322. Each real-time processor 323 is designed to process the records generated by an event, and to output as complete a record of each event as possible within a determined time period of the termination of the event. Completed event records may be accessed by a variety of systems that require-continuous updating such as traffic statistic processors.

As the record is completed, or in case the determined time period expires without a complete record, information processed up to that time is forwarded to further systems represented in FIG. 3 as deferred event processing 325. As the name implies, deferred processing does not have the real-time constraints of real-time processors 323, although, in the case of an incomplete event record created by a real-time processor unit 323, deferred event processing may well directly act on raw resource data generated in the communication system. Deferred processing completes, reformats, and indexes information from real-time processors 323 and creates archivable records based on event information and tabular information supplied by other sources.

The communication network of FIG. 3 may well provide services other than POTS (plain old telephone service). In another embodiment, the network may be accessed by dedicated access terminals, as well as, packet-switched data sources based on other networks (303-305). Data from these packet-switched sources, although bypassing local exchange 302 may include routing information imbedded in the data, and represent another network event. Such data may be assigned a call tag. The call tag is propagated through the network to generate resource records in the same fashion-as described above.

It will be understood that the diagram of FIG. 3 represents only the routing path of a single representative network event. The network may include any number of switching sites and other resources, and that an incoming event may originate and terminate at any selected sites on the network.

Figure 5:
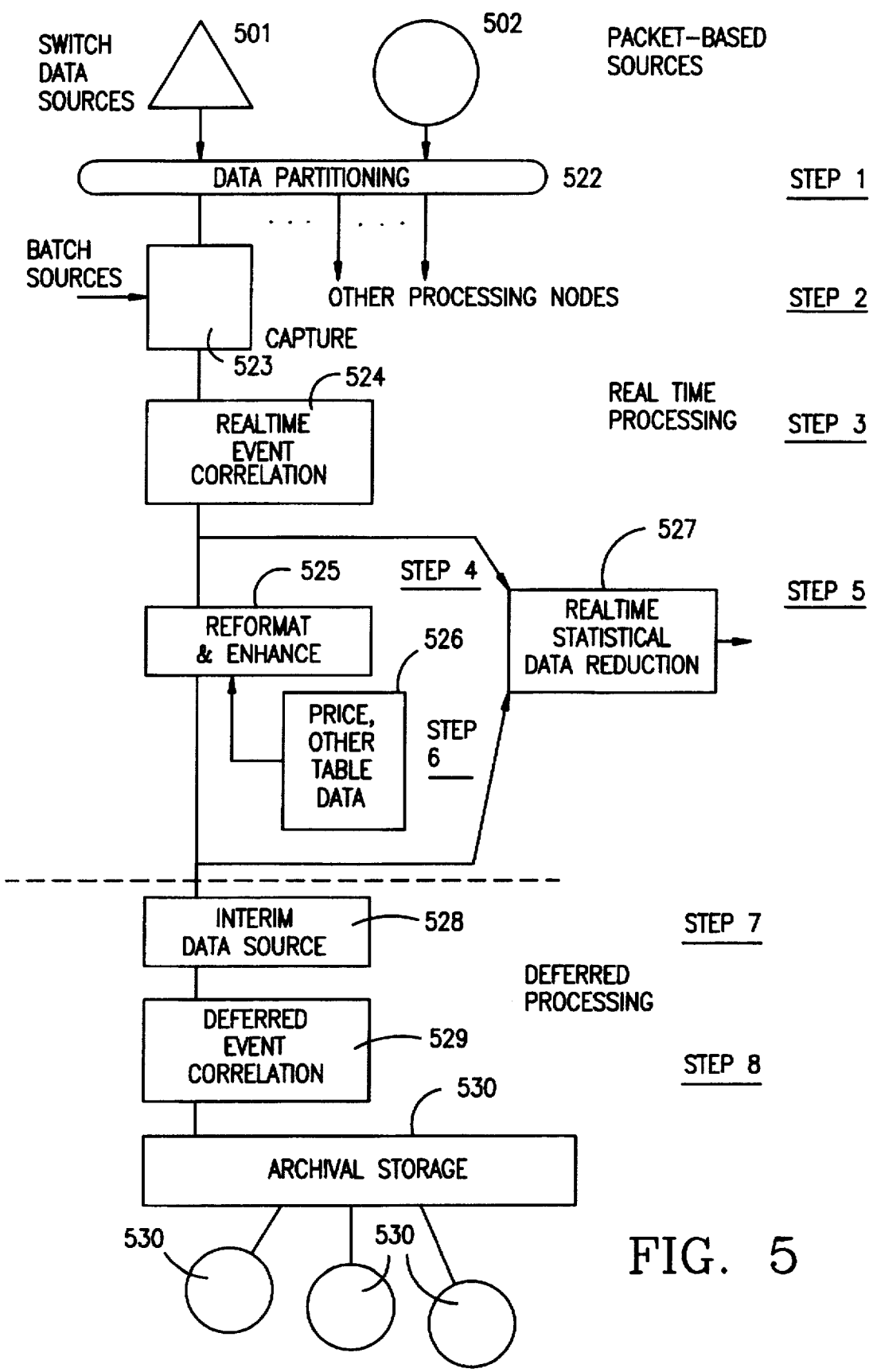
FIG. 5 is a flow diagram which implements the process executed in the telecommunications network of FIG. 3.

FIG. 5 is a more detailed diagram of processing steps within a representative real-time processing node and the deferred event processing stage.

Raw resource data from switch-based data sources 501 and packet-based data sources 502 is partitioned in step 1 at data partitioning stage 522 among a number of real-time processing nodes. (In a system not designed to communicate a high volume of packet-based data from sources 502, it would be conceivable to directly assign data from switches 501 to associated real-time processing nodes.)

Partitioned raw records with associated call tags are captured from data partitioning stage 522 by capture stage 523 in step 2. Stage 523 is designed to handle all network protocol required by the real-time processing node, as well as to accept batched requests from other downstream sources (e.g. retransmission requests from the deferred processing stage).

In step 3, real-time event correlation stage 524 accepts individual records from capture stage 523 and, based on the associated call tags, combines them into a single record that preferably provides an end-to-end view of the event. High-speed matching of records with the same call tag value is carried out either until all expected records have been combined, or until a certain time-out period (e.g. 30 minutes) has passed since the last known event record has been created. In step 4, complete and incomplete records are both sent downstream to stage 525. Stage 525 accepts records compiled within real-time correlation stage 524 and creates a standard record of a form used throughout the remainder of system. Preferably, the standard record has the properties that:

A single field has a single meaning (unlike call-tagged resource records).

Individual fields from prior records are collected and grouped into physical segments within the standard record.

Fields within the output record are byte-aligned into character and binary numerical fields.

Matched data is also made available to systems requiring continuous updating such as real-time statistical data reduction stage 527 in step 5. The output of stage 527 may be used to monitor traffic on the communications network.

After a standard record of an event has been created, it may be augmented with additional information. The augmenting information must be contained within the limited resources of a real-time processing node without continuous updating from a central data base, and therefore must be relatively time-stable. For example, a customer's name and address may well not be stable between the time of receipt of an event and the time the account is billed, and thus would not be included. In a preferred method, the augmenting information (possibly any necessary control information as well) is updated from a central reference file at least once per day.

Before the standard record exits real-time processing, it is advantageous in a step 6 to combine the record information with pricing information 526 (as supplied by tariff tables). Pricing within the real-time processing node is limited to pricing of a single event, as summary or aggregate data is not available at the node. The priced and assembled standard records 526 may be made available to real-time processes (e.g. stage 527). The records are also passed to deferred processing.

In step 7, interim data store 528 is the first stage in deferred or non-real-time processing. In addition to record storage (preferably up to seven days' worth), stage 528 also compiles indices into the data and enables low-volume indexed retrieval. The preferred index fields are ANI, the digits dialed, the originating switch or port, terminating switch or port and sequence or customer number. Any other desired fields may be selected. In the preferred system, records are processed through the real-time processor 323 (see FIG. 3) and are retrievable through an index within seconds of being captured at stage 523.

In step 8, deferred event correlation stage 529 accepts data from interim data store 528. The step acts as a safety net in case real-time correlation stage 524 is not able to compile/ match all records for a given event within the time-out period. The time-out period for the deferred event correlator is very long (e.g. 90 days). The deferred event correlator also has a function of detecting gaps in the reported list of switch records. If a gap is detected, stage 529 sends a retransmission request to the capture stage 523 which in turn requests retransmission of data from the targeted network resource.

From the deferred event correlator 529, data is passed into archival storage 530, in a step 929. Preferably, archival storage 530 is hierarchical in structure, based on frequency of use. Records are grouped by attribute (e.g. switch number, customer group, product group). Archival storage 530 is designed to be accessed by client processes such as billing, and thus preferably includes controls to insure one-time-only retrieval of any given data by selected clients. In the preferred system, archival data is available within a few hours after related records have been captured at stage 523.

The communications network embodying the invention is thus able to track any event on the network through all the system resources involved, and provides an end-to-end record, including pricing, of the entire event. The operator of the network is able to generate billing and summary information that accurately reflects customers' use of network resources and is easily able to update, modify, or customize network service based on any desired diverse types of pricing and billing information for customer use of the network.

The foregoing description represents the overall operative method of a preferred embodiment of the invention. It will be recognized by those of ordinary skill in the art that various modifications may be made without departure from the concepts inherent in the invention.

We claim:

1. In a telecommunications network, a system for automatically, in real-time, creating and maintaining records of customer use of the network for diverse types of service and costs, comprising:
 a) means for initiating diverse types of service at different costs for customer use on the network;
 b) means for labeling each customer unit an event and assigning a tag to each event;
 c) means for transmitting the event through at least one switching device in the network;
 d) means for creating at each switching device a record of each event;
 e) means for distributing the stored records to at least one processor; and
 f) means for generating a record of events for each customer use within a determined time period of the termination of the event.

2. The system of claim 1 further including means for storing the record at each switching device.

3. The system of claim 2 further including means for deferred processing the records stored at the switching devices.

4. The system of claim 3 wherein the tag includes index fields for compiling indices from data represented in the fields for data retrieval purposes.

5. The system of claim 4 wherein each record includes field having a single meaning; individual fields from prior records are collected and grouped into physical segments within the record, and when outputted fields are byte-aligned into character and binary numerical fields.

6. The system of claim 5 wherein the event may be telephone call or packet data originated.

7. In a telecommunications network, a method for automatically, in real-time, creating and maintaining records of customer use of the network for diverse types of service and costs, comprising the steps of:
 a) collecting and tagging customer use of the network as an event;
 b) forming a record of each event at each switching device in the network;
 c) partitioning and capturing all records and associated tags;
 d) performing real-time event correlation based upon call tags and combining them into a single record;
 e) matching records with the same call tag after real-time event correlation to form standard records; and
 f) incorporating additional information into the standard record as a basis for billing the customer for use of the diverse types of services and costs on the network.

8. The method of claim 7 further including the steps of:
 i) storing on a interim basis the standard records and compiling indices;
 ii) compiling and matching the stored standard records for a given event within a predetermined time period;
 iii) archiving the compiled and matched standard records for business purposes related to the network.

9. The method of claim 8 wherein the compiling and matching the stored standard record further includes the step of:
 i) detecting missing information in the stored records and requesting a retransmission of data from the above partitioning and capture step.

10. The method of claim 7 further including the step of:
 i) supplying pricing, tax and pricing information as additional information for billing customer use of the network.

* * * * *